4 Sheets—Sheet 1.

A. S. HARDING.

MACHINES FOR RAKING AND BINDING GRAIN.

No. 7,169. Reissued June 13, 1876.

Attest:

C. Clarence Poole

N. B. Smith

Inventor:

Abner S. Harding

By his Atty

R. D. O. Smith

N. PETERS, PHOTO-LITHOGRAPHER, WASHINGTON, D. C.

A. S. HARDING.

MACHINES FOR RAKING AND BINDING GRAIN.

No. 7,169. Reissued June 13, 1876.

Attest:

C. Clarence Poole

N. B. Smith.

Inventor:

Abner S. Harding

By his atty R. D. O. Smith

N. PETERS, PHOTO-LITHOGRAPHER, WASHINGTON, D. C.

A. S. HARDING.

MACHINES FOR RAKING AND BINDING GRAIN.

No. 7,169. Reissued June 13, 1876.

Attest:

C. Clarence Poole

N. B. Smith.

Inventor

Abner S. Harding

By his Atty

R. D. O. Smith

N. PETERS, PHOTO-LITHOGRAPHER, WASHINGTON, D. C.

A. S. HARDING.

MACHINES FOR RAKING AND BINDING GRAIN.

No. 7,169. Reissued June 13, 1876.

Attest:
C. Clarence Poole
N. B. Smith

Inventor:
Abner S. Harding
By his atty
R. D. O. Smith

N. PETERS, PHOTO-LITHOGRAPHER, WASHINGTON, D. C.

UNITED STATES PATENT OFFICE.

ABNER S. HARDING, OF GOSHEN, NEW YORK, ASSIGNOR, BY MESNE ASSIGNMENTS, TO SYLVANUS D. LOCKE.

IMPROVEMENT IN MACHINES FOR RAKING AND BINDING GRAIN.

Specification forming part of Letters Patent No. 34,999, dated April 15, 1862; reissue No. 7,169, dated June 13, 1876; application filed May 18, 1876.

*To all whom it may concern:*

Be it known that I, ABNER S. HARDING, of Goshen, but formerly of Mount Hope, in the county of Orange and State of New York, have invented certain new and useful Improvements in Machines for Binding Grain; and I do hereby declare the following to be a full, clear and exact description thereof, reference being had to the accompanying drawings, wherein—

Figure 1:
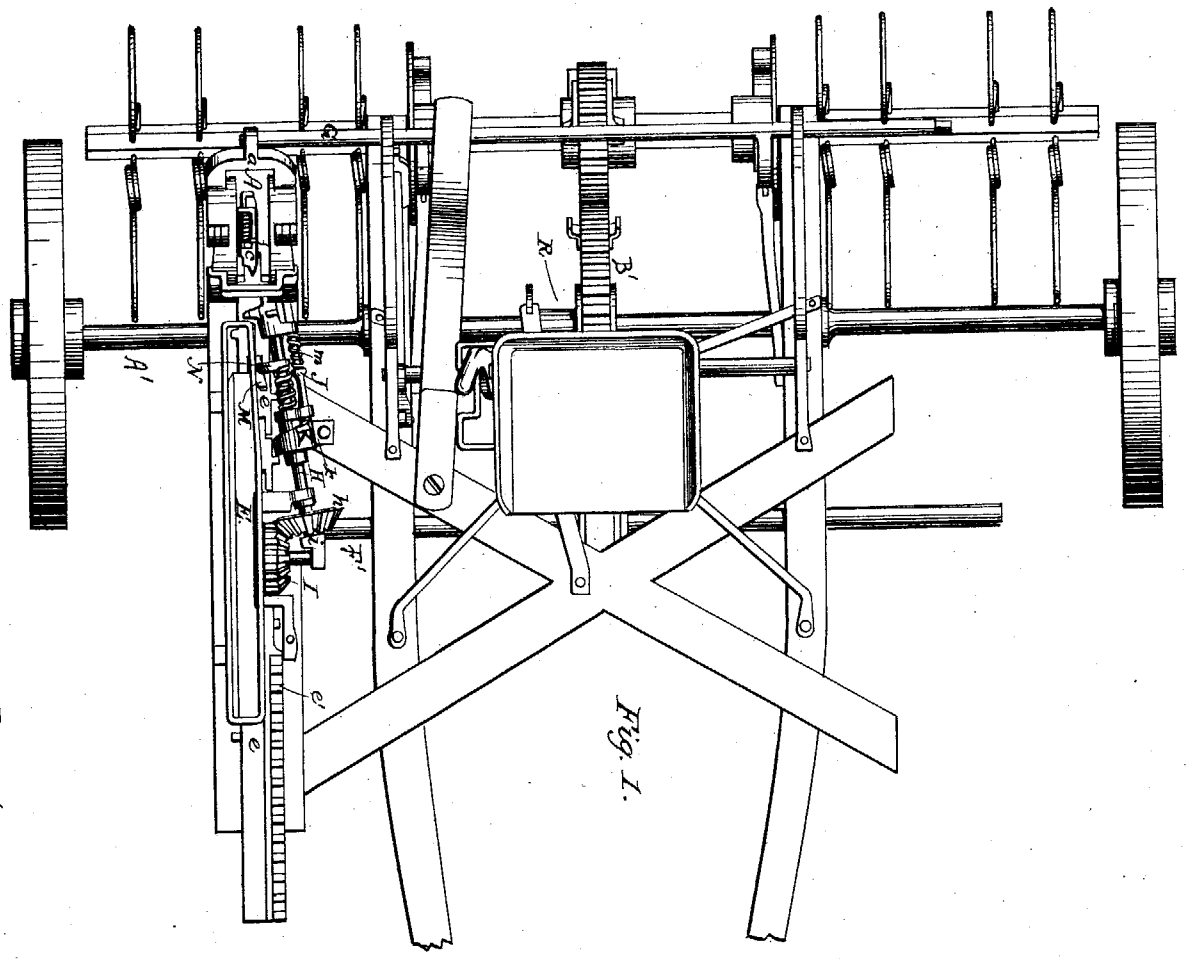
Figure 5:
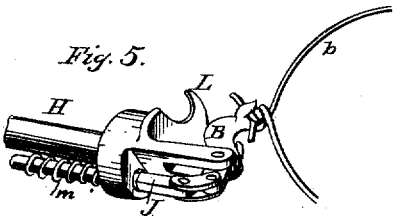
Figure 6:
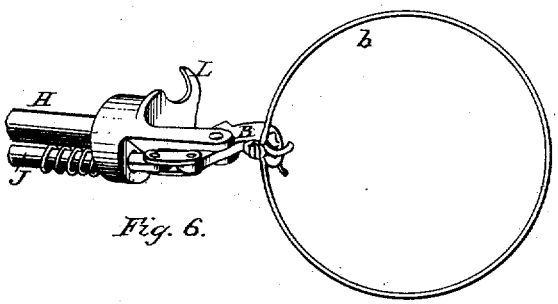
Figure 7:
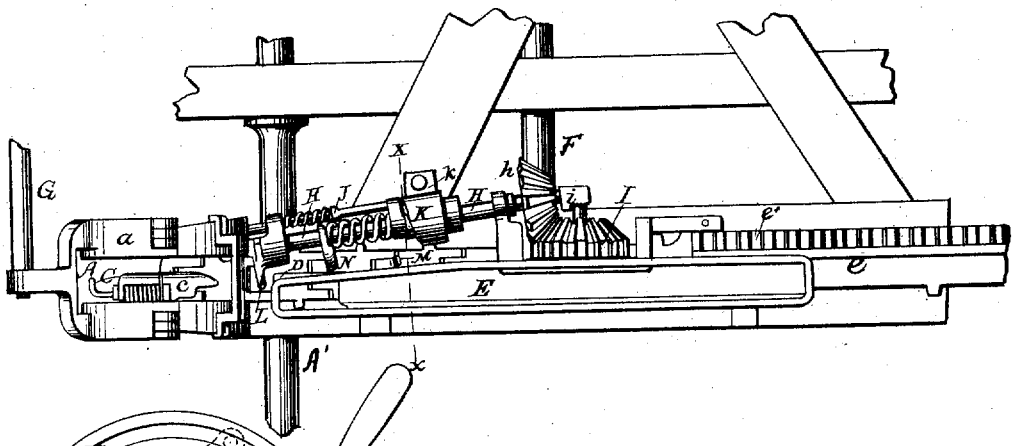
Figure 8:
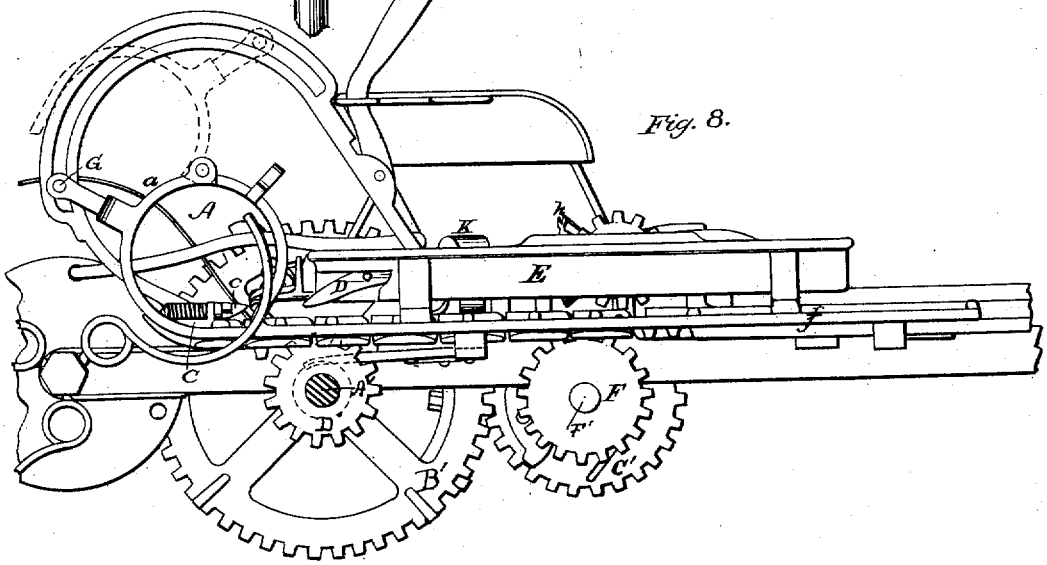
Figure 9:
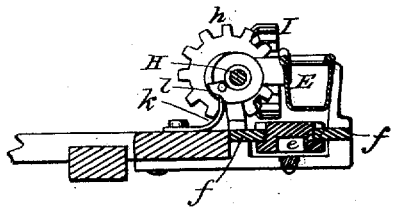
Figure 10:
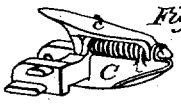
Figure 11:
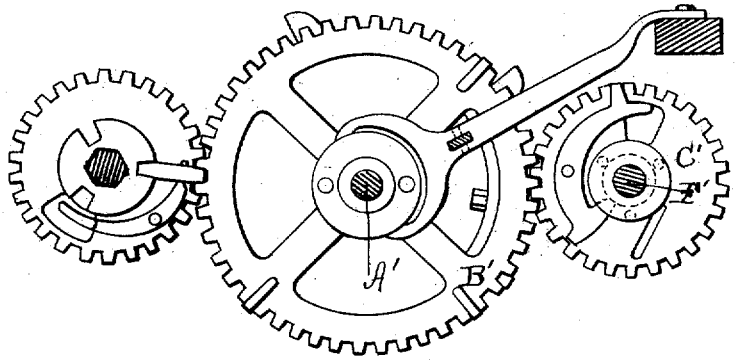
Figure 12:
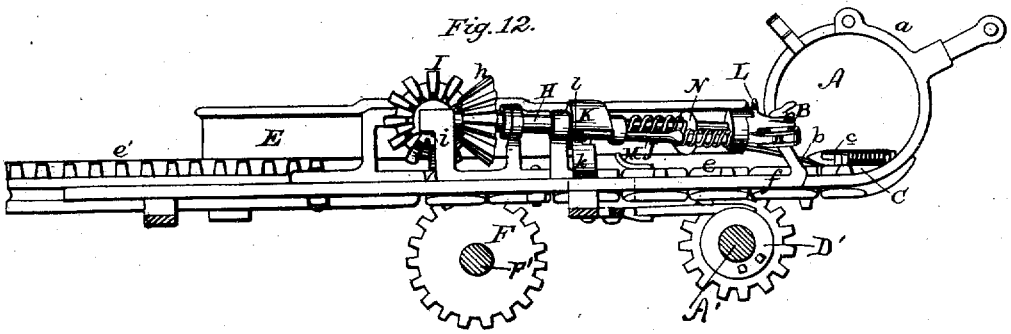
Figure 13:
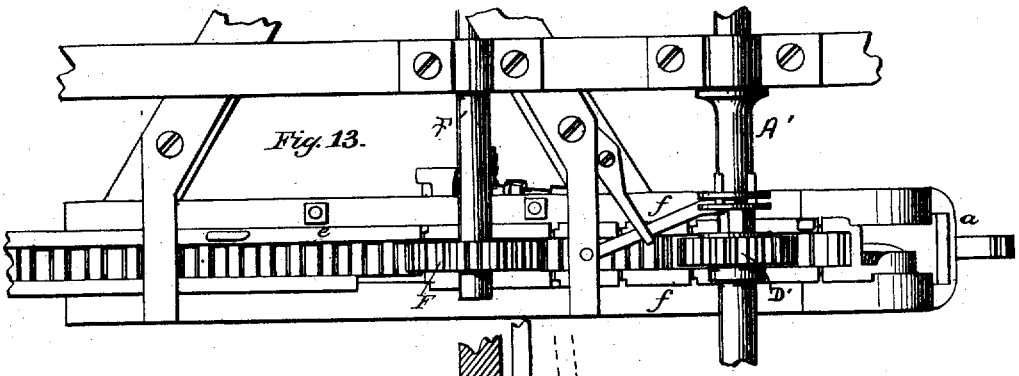
Figure 14:
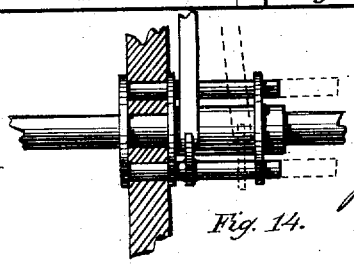

Figure 1 is a plan view of my binding mechanism mounted upon a raking-machine. Figs. 2, 3, 4, 5, and 6 represent, in detail, the operation of the twister. Fig. 7 is a plan view of the binding apparatus. Fig. 8 is a side elevation of the same. Fig. 9 is a transverse section of the same on line *x x*. Fig. 10 is a perspective view of the grapple for seizing and holding the end of the band. Fig. 11 is a side elevation of the mechanism for transmitting motion to the binder. Fig. 12 is an inner side elevation of the binding mechanism. Fig. 13 is a bottom plan of the same. Fig. 14 represents the gearing-clutch.

My improvement may be used with a machine for raking and gathering the cut grain from the ground or attached to a reaping-machine. When attached to a reaping-machine, the grain will be taken from the bed or platform of the reaper upon which the rake of the reaper delivers it, and suitable means will be used to make the connection and to communicate the power to work the parts. Straw or its equivalent may be used for the band.

(A′.) This invention relates more particularly to that class of binders wherein the ends of the band are twisted together in the operation of securing them. This result is accomplished by means of a rotating hook, by which the end parts of the band are seized and twisted around each other by its rotation. In addition to this principal device, to wit, A the twister for the ends of the band, there are several minor and supplementary devices additional, but not essential, to the twisting above mentioned, viz., B, a device for seizing automatically the free end of the band *c*; C, a device for conveying said band around the sheaf and to the twister B; D, a device for compressing the sheaf, and holding it so while the band is being conveyed around it and fastened; E, a device for effecting an intermittent rotary movement of the twister; F, a device for producing a forward and backward movement of the twister to assemble the two parts of the band in the twister; G, a device to produce a forward movement of the twister to tuck the twisted ends under the bands; and H, a device for arresting the movement of the binder during the time required to collect a gavel of requisite size. These are individual devices, producing individual effects, either one or more of which may be varied or omitted without effecting the remainder, and they will therefore be described in their separate capacities.

Figure 3:
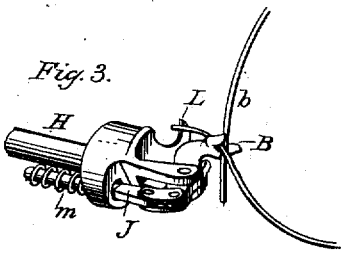
Figure 4:
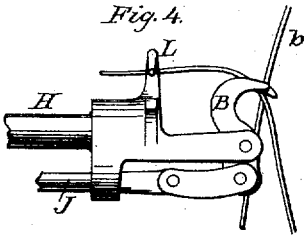

(A.) The cut grain is delivered within the compressor A, the hinged arm *a* of which then moves upon its joint, and compresses the grain. The end of the band *b* is conveyed around the compressed bundle, the standing end being drawn through or between the prongs of the twister B, and the free end being also delivered between said prongs in the opposite direction, so that the two parts are crossed between said prongs as shown in Figs. 3 and 4, when it is apparent that a rotation of said hook upon an axis perpendicular to the axis of the sheaf will cause the ends of the band to rotate about each other, and be twisted together. Such rotation takes place when the shaft is caused to revolve, and the ends are thereby twisted, as shown in Fig. 5.

(B.) The device for seizing the free end of the band to draw the same out, and convey it around the sheaf, consists of a plate, C, which passes under the end of said band, and a clamp-plate, *c*, which is actuated by a stiff spring. As the plate approaches the end of the band a latch-plate, D, at the front end of the trough E, (which is employed when straw is used for a band,) encounters the free edge of the clamp *c*, and forces it to rise up as it advances, and when it has advanced far enough to have passed the end of the band it slides off the rear end of said latch-plate, and said clamp's spring causes it to close upon and gripe the end of the band ready to convey it around the next bundle introduced.

(C.) The clamp-plate C is attached to the forward end of the jointed rack or chain *e*, which at the proper moment is impelled by the rotation of the pinion F, and slides along the track-bars *f*, which rest in grooves on each side of said jointed rod or chain. The compresser, when closed, constitutes a continuation of the trackway formed by the side bars *f*, and when the joint rack or chain is forced forward its end, bearing the clamp *c*, travels along the compressor, and is thereby conducted around the bundle, drawing the band after it. When the bundle has been completely encircled, the twister B advances and forces the clamp to open and release the end of the band, which, by the same movement is caught by the twister, and immediately thereafter twisted around the other end of the said band.

(D.) The compressor is a hinged arm, *a*, curved about a center, which may also be a center for the stationary or receptacle portion of the compressor. The arm *a* is hinged to the stationary part, and is moved upon said hinge by a rod, G, which travels in a suitable guideway, and is actuated by the operative part of the machine to open and close said hinged arm at will of the driver. When the requisite quantity of cut grain has been delivered into the receptacle or stationary part, the hinged arm is closed, and thereby said bundle is forcibly compressed and fitted to receive the band.

(E.) The shaft H, to the front end of which the twister B is attached, is mounted in suitable bearings, so that it is capable of free rotation, and it is provided with a bevel-wheel, *h*, which meshes with a corresponding bevel and spur-wheel, I, whose bearing is in a stud, *i*. The spur portion of the wheel meshes with the cogs of the rack *e'*, which forms a part and continuation of the joint rack or chain *e*. Said chain, however, has a much longer movement than the length of the rack *e'*, so that it is only in mesh with said wheel I during a portion of its reciprocation. This portion is the latter part of its forward and first part of its backward movement, so that the rotation of the twister takes place intermittently, and only during that portion of the reciprocation of the joint rack when the same is in mesh with the wheel.

The motion to move the band-carrier *e* forward is transmitted from the main axle A', through the wheels B' and C', shaft F', and pinion F. At the end of said forward movement the wheel C' is automatically thrown out of gear, and the wheel D' on the main axle is automatically thrown into gear, and the backward movement of said band-carrier is thereby produced.

(F.) The twister B is a hook with a forked point, pivoted to a stud set eccentrically in the end of the shaft H. The opposite end of the shank of said hook is connected by a link to one end of a sliding rod, J, the other end of which rests upon a cam, K, which is set loosely upon said shaft. Said cam is capable of revolution upon said shaft, but not of movement in an endwise direction thereon. A stationary stud or stop, *k*, having a slight elasticity, is mounted upon the stationary frame, and bears against the cylindrical edge or periphery of the cam. At a certain point said stud engages in a notch, *l*, cut in said periphery of the cam, and keeps it from moving with the rotation of the shaft H during the forward movement of the jointed rack or chain *l*; but permits said cam to rotate with said shaft during its rotation while the said rack is moving backward.

Figure 2:
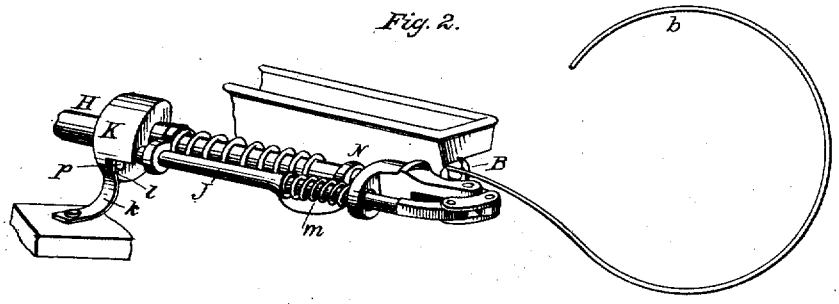

The effect of this arrangement is as follows: The initial portion of the parts is shown in Fig. 12. At this point the band has been carried partly around the sheaf, and the rack *e'* is about to go into mesh with the wheel I, so as to commence the rotation of the shaft H in the direction of the arrow. During this rotation the rod J travels up the cam K, and the hook B is thrown back behind the stationary hook L, which has gathered up the band *b*, as shown in Fig. 2, as it is being drawn out. When the rod J passes the point of the cam K it slips off, being actuated by the extension of the spring *m*, and at the same moment the stop *k* engages the notch *i*.

The recession of the rod J, as above, causes the hook B to be thrown forward to the position shown in Figs. 3, 4, and 5, carrying the standing part of the band with it, and with one point forcing open the clamp, so as to liberate the other or forward end of the band, which is also thereby gathered between the forks of the hook, as shown in Fig. 5. This occurrence marks the extreme forward limit of the movement of the jointed rack *e*, which then begins to retreat, and thereby produces a backward rotation of the rod J and twisting-hook, to twist the ends of the band, as shown in Fig. 5. The backward rotation of the shaft H carries the cam with it, because the rod J is then in position behind the point of the cam K, and the stop *k* cannot offer any resistance to a rotation in that direction. At the completion of this revolution the rack *e'* goes out of gear, and said stop re-engages with the notch *l*. Immediately following the disengagement of the rack *e'* and its driving-wheel I a finger, M, rigidly attached to the jointed chain, engages with the projecting sliding collar N on the rod H, and pushes the rod J still farther backward through a hole, *p*, in the cam K, whereby the hook B is thrown still farther forward, so as to force the free ends beneath the band, as shown in Fig. 6. When the finger is disengaged from said collar the spring *m* immediately impels the rod J forward again, and the parts are then again in their initial position, and ready for the operation of binding the succeeding bundle.

(G.) In average grain sufficient is cut during an advance of about six and one-half feet to form a proper-sized bundle, and the parts of the machine may be so timed and adjusted that the several operations of gathering and binding will take place during an advance over that distance. But it sometimes happens that the grain in a field will be very thin, and it varies very greatly in different parts of the same field, so that an insufficient quantity will be cut during an advance of six and one-half feet, and it is therefore desirable that the driver shall have power to disconnect and connect again at will the binding and driving mechanism, so as to seize the bundles properly, irrespective of the thickness of the grain standing. I therefore provide a clutch, R, upon the shaft, whereby the wheel which transmits motion from the axle to the binding mechanism may be connected or disconnected at will. Said clutch is operated by a lever, located within convenient reach of the driver.

A sliding pinion and shipper for the purpose of throwing in and out of gear is unsuitable for operation in the field, because of the extent of movement required, and the difficulty of bringing the pinion and its wheel into engagement unless the parts are at rest or moving very slowly. It is therefore desirable, and my intention, to employ a clutch adapted to the purpose of engagement and disengagement alone.

Having described my invention, what I claim, and for which I desire Letters Patent of the United States, is—

1. Combined with the automatic mechanism for gathering and compressing a bundle of grain, and conveying the band around the same, a revolving hook, adapted to seize, and in its revolutions to twist together, the ends of the band.

2. Combined with the side bars *f* and the compressing-arm *a*, the sliding jointed chain-rack *e*, bearing at its front end a clamp, to seize and hold the end of the band, for the purpose set forth.

3. Combined with the rotary shaft H, bearing at its front end a twister-hook, the pinions *h* and I and the reciprocating rack *e'*, which goes out of engagement with said pinions during a portion of its reciprocation, for the purpose of imparting an intermittent rotation to said shaft, as set forth.

4. Combined with the rotating shaft H, to the front end of which the twister-hook is hinged, the rod J, the loose cam K, provided with a notch, *l*, and spring, and the stop-stud *k*, to prevent a rotation of said cam in one direction, for the purpose of producing an extension and retraction of the twisting-hook, in the manner shown.

5. Combined with the rotating shaft, bearing the twisting-hook at its front end, and the rod and cam for extending and retracting the same, the finger M on the reciprocating joint rod or chain *e*, and collar N on the rod H, for the purpose of projecting said hook forward to tuck the ends of the band, as set forth.

6. Combined with the automatic mechanism for gathering and compressing a bundle of grain, and for conveying a band around said bundle and securing the ends of the same, a clutch, whereby said binding mechanism may be connected or disconnected from its driving mechanism, for the purpose of seizing the bundles, at will.

ABNER S. HARDING.

Witnesses:

SYLVANUS D. LOCKE,
HERBERT GEDNEY.